United States Patent
Nakatsugawa et al.

(10) Patent No.: US 9,720,759 B2
(45) Date of Patent: Aug. 1, 2017

(54) SERVER, MODEL APPLICABILITY/NON-APPLICABILITY DETERMINING METHOD AND NON-TRANSITORY COMPUTER READABLE MEDIUM

(71) Applicant: KABUSHIKI KAISHA TOSHIBA, Minato-ku (JP)

(72) Inventors: Minoru Nakatsugawa, Kanagawa (JP); Takeichiro Nishikawa, Kanagawa (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 146 days.

(21) Appl. No.: 14/656,949

(22) Filed: Mar. 13, 2015

(65) Prior Publication Data

US 2015/0269014 A1   Sep. 24, 2015

(30) Foreign Application Priority Data

Mar. 20, 2014   (JP) ................................ 2014-059008

(51) Int. Cl.
  *G06F 11/34*  (2006.01)
  *G06F 11/07*  (2006.01)
  *G06F 11/00*  (2006.01)

(52) U.S. Cl.
  CPC .......... *G06F 11/079* (2013.01); *G06F 11/008* (2013.01); *G06F 11/0709* (2013.01);
  (Continued)

(58) Field of Classification Search
  CPC ......................... G06F 11/3447; G06F 11/3452
  See application file for complete search history.

(56) References Cited

U.S. PATENT DOCUMENTS

| | | | |
|---|---|---|---|
| 7,031,879 B1 * | 4/2006 | Loboz | G06F 11/004 702/182 |
| 2002/0073290 A1 * | 6/2002 | Litvin | G06F 3/0611 711/170 |

(Continued)

FOREIGN PATENT DOCUMENTS

| | | | | |
|---|---|---|---|---|
| GB | 2408360 A | * | 5/2005 | .......... G06F 11/3428 |
| JP | 2004-253035 A | | 9/2004 | |

(Continued)

*Primary Examiner* — Yolanda L Wilson
(74) *Attorney, Agent, or Firm* — Oblon, McClelland, Maier & Neustadt, L.L.P.

(57) ABSTRACT

A server includes a distribution difference calculator and a determining unit. The distribution difference calculator calculates difference information between a first distribution of features calculated from operating data of terminal devices of a first machine type and a second distribution of features calculated from operating data of terminal devices of a second machine type. The determining unit determines whether a model is applicable to the terminal devices of the first machine type to predict occurrence possibility of a failure in each terminal device of the first machine type on basis of the difference information wherein the model is generated on basis of operating data of the terminal devices of the second machine type and is configured to predict occurrence possibility of a failure in each terminal device of the second machine type on basis of each of the features calculated from the operating data thereof.

10 Claims, 15 Drawing Sheets

(52) U.S. Cl.
CPC ...... *G06F 11/0751* (2013.01); *G06F 11/3447* (2013.01); *G06F 11/3452* (2013.01)

(56) References Cited

U.S. PATENT DOCUMENTS

| | | | | |
|---|---|---|---|---|
| 2009/0150137 | A1* | 6/2009 | Kumazaki | G06F 11/3419 703/14 |
| 2009/0326869 | A1* | 12/2009 | Baba | G06F 11/3419 702/186 |
| 2010/0083055 | A1* | 4/2010 | Ozonat | G06F 11/0709 714/47.2 |
| 2011/0046924 | A1* | 2/2011 | Natarajan | G06F 17/18 703/2 |
| 2011/0239051 | A1* | 9/2011 | Basu | G06F 11/079 714/37 |
| 2013/0041644 | A1* | 2/2013 | Cremonesi | G06Q 10/06 703/13 |
| 2013/0151907 | A1* | 6/2013 | Nakagawa | G06F 11/3452 714/47.1 |
| 2013/0158950 | A1* | 6/2013 | Cohen | G06F 17/00 702/176 |
| 2013/0282337 | A1* | 10/2013 | Fujiwaka | G06F 11/3414 702/186 |
| 2014/0143610 | A1 | 5/2014 | Nakatsugawa et al. | |
| 2014/0181363 | A1* | 6/2014 | Hoang | G06F 1/26 711/103 |
| 2014/0188446 | A1* | 7/2014 | Kimura | G06F 11/3447 703/2 |
| 2014/0281739 | A1* | 9/2014 | Tuffs | G06F 11/3452 714/47.2 |
| 2015/0269053 | A1* | 9/2015 | Kato | G06F 11/3428 718/105 |

FOREIGN PATENT DOCUMENTS

| | | | |
|---|---|---|---|
| JP | 4337461 B2 | 9/2009 | |
| JP | 2011-8562 A | 1/2011 | |
| JP | 2013-73326 A | 4/2013 | |
| JP | 2014-102636 A | 6/2014 | |
| WO | WO 9945467 A1 * | 9/1999 | .......... G06F 11/3447 |

* cited by examiner

| PRODUCT ID | 6548D26H |
|---|---|
| OBSERVATION TIME | 2009/8/17 9:21 |
| CPU TEMPERATURE | 43°C |
| VERTICAL ACCELERATION | 0.8946G |
| BUTTON MANIPULATION TINES | 12 TIMES |
| CURRENT | 3.2A |
| HDD IMPACT TIMES | 2 TIMES |
| HDD POWER-ON TIME | 1425h |
| HDD TEMPERATURE | 43°C |
| HDD HEAD LOAD/UNLOAD TIMES | 6124 TIMES |
| HDD MALFUNCTION SECTORS NUMBER | 31 SECTORS |
| HDD READ ERROR RATE | 0.021 |

FIG. 3

| PRODUCT ID | 6548D26H |
|---|---|
| HDD TYPE NUMBER | HDD0123A |

FIG. 4

| |
|---|
| AVERAGE OF CPU TEMPERATURE |
| MAXIMUM OF VERTICAL ACCELERATION |
| AVERAGE OF CURRENT |
| MAXIMUM OF HDD IMPACT TIMES |
| HDD POWER-ON TIME |
| AVERAGE OF HDD TEMPERATURE |
| HDD HEAD LOAD/UNLOAD TIMES |
| HDD MALFUCTION SECTORS NUMBER |
| HDD READ ERROR RATE |

FIG. 5

| PRODUCT ID | HDD TYPE NUMBER |
|---|---|
| 6548A26H | HDD0123A |
| 7568B26R | HDD0123A |
| 8238A25W | HDD0123B |
| 4348C26A | HDD2124C |
| 2838521E | HDD2124D |

FIG. 6

| PRODUCT ID | 6548D26H | 8654D26J | 7548C26K | 5548C26A | 1548E26B |
|---|---|---|---|---|---|
| OBSERVATION TIME | 2009/8/17 9:21 | 2010/4/12 9:28 | 2009/2/13 4:01 | 2011/8/17 3:11 | 2008/7/1 1:22 |
| CPU TEMPERATURE | 43°C | 53°C | 39°C | 47°C | 45°C |
| VERTICAL ACCELERATION | 0.8946G | 0.9946G | 0.9946G | 0.8931G | 0.8956G |
| BUTTON MANIPULATION TIMES | 12 TIMES | 1 TIME | 2 TIMES | 15 TIMES | 7 TIMES |
| CURRENT | 3.2A | 3.2A | 3.2A | 3.2A | 3.2A |
| HDD IMPACT TIMES | 2 TIMES | 0 TIME | 0 TIME | 1 TIME | 2 TIMES |
| HDD POWER-ON TIME | 1425h | 125h | 142h | 425h | 145h |
| HDD TEMPERATURE | 43°C | 53°C | 33°C | 23°C | 43°C |
| HDD HEAD LOAD/UNLOAD TIMES | 6124 TIMES | 614 TIMES | 624 TIMES | 124 TIMES | 612 TIMES |
| HDD MALFUNCTION SECTORS NUMBER | 31 SECTORS | 3 SECTORS | 1 SECTOR | 0 SECTOR | 0 SECTOR |
| HDD READ ERROR RATE | 0.021 | 0.002 | 0.001 | 0.000 | 0.000 |

FIG. 7

SERVER, MODEL APPLICABILITY/NON-APPLICABILITY DETERMINING METHOD AND NON-TRANSITORY COMPUTER READABLE MEDIUM

CROSS-REFERENCE TO RELATED APPLICATIONS

This application is based upon and claims the benefit of priority from Japanese Patent Application No. 2014-059008, filed Mar. 20, 2014; the entire contents of which are incorporated herein by reference.

FIELD

Embodiments of the present invention relate to a server, a model applicability/non-applicability determining method and a non-transitory computer readable medium.

BACKGROUND

In order to preserve data saved in a hard disk drive (HDD), it is important to grasp the health status of the HDD. Analyzing operating history data on failure HDDs can construct a failure symptom model for detecting future failure occurrence from operating data. Using the failure symptom model, a probability of failure occurrence, for example, within a predetermined period is calculated. When the probability is equal to or greater than a threshold, the presence of a failure symptom can be determined.

In this case, change in product generation sometimes leads to change in behavior of the HDD and the failure symptom model constructed from past operating data does not possibly achieve accuracy as expected. In order to investigate the accuracy of the model with respect to an HDD in a new generation, the operating history data on the failure HDDs is needed. Accumulation of the data takes time. Assuming that the model is applied to failure symptom detection of the HDD in the new generation with the investigation of the accuracy being insufficient, low accuracy of the model causes a problem of frequent occurrence of overlooking and erroneous warning. The overlooking means that a failure occurs within a predetermined period in spite of a prediction result indicating the absence of a failure symptom. The misdetection means that a failure does not occur within a predetermined period in spite of the presence of a failure symptom.

BRIEF DESCRIPTION OF THE DRAWINGS

FIG. 3 illustrates an example of operating data;

FIG. 4 illustrates an example of component type number data;

FIG. 5 illustrates an example of variables;

FIG. 6 illustrates an example of type number management data;

FIG. 7 illustrates an example of the operating data stored in an operating data storage;

DETAILED DESCRIPTION

According to one embodiment, a server including a processor includes a distribution difference calculator and a determining unit.

The distribution difference calculator calculates difference information between a first distribution and a second distribution, the first distribution being a distribution of features calculated from operating data of terminal devices of a first machine type and the second distribution being a distribution of features calculated from operating data of terminal devices of a second machine type wherein the second machine type is different from the first machine type.

The determining unit determine whether a model is applicable to the terminal devices of the first machine type to predict occurrence possibility of a failure in each of the terminal devices of the first machine type on basis of the difference information wherein the model is generated on basis of operating data of the terminal devices of the second machine type and is configured to predict occurrence possibility of a failure in each of the terminal devices of the second machine type on basis of each of the features calculated from the operating data thereof.

Hereafter, embodiments of the present invention are described with reference to the drawings.

First Embodiment

Figure 1:
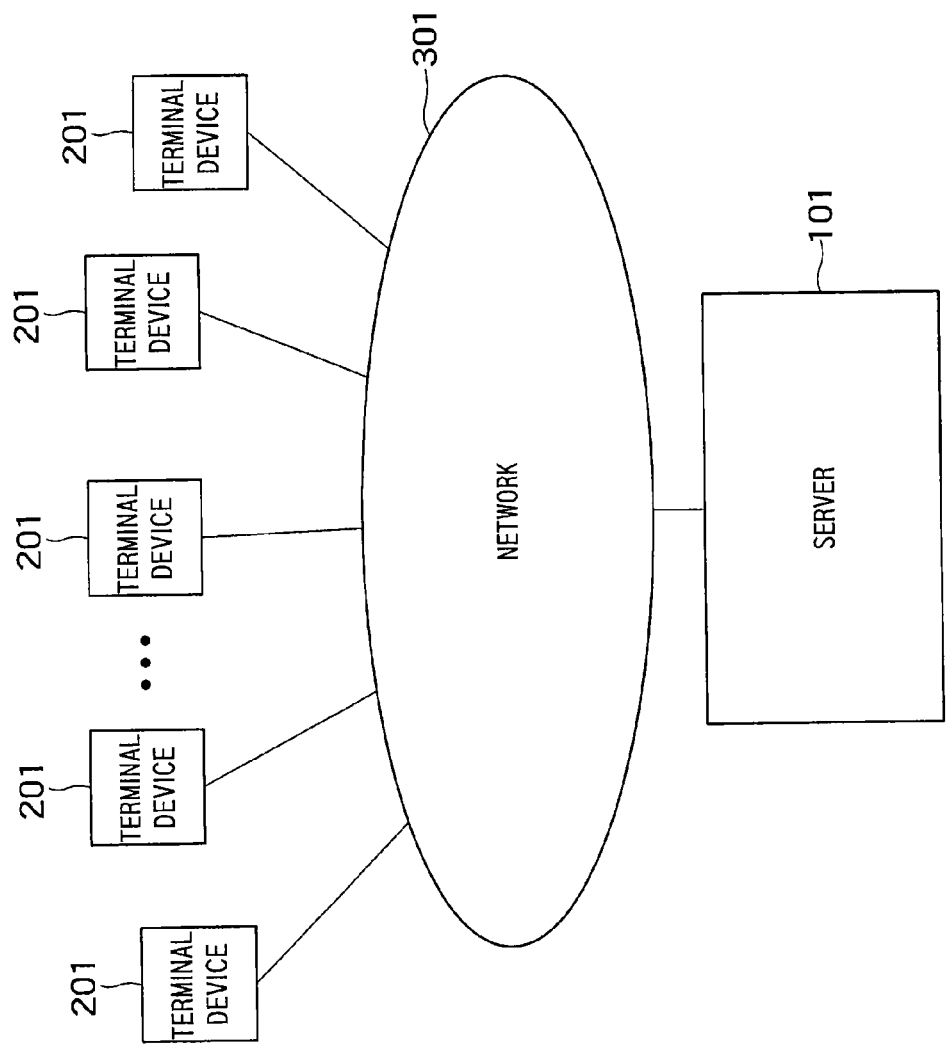
FIG. 1 is an overall diagram of a system according to an embodiment of the present invention in which a server and terminal devices communicating with the server are connected to one another via a network.

FIG. 1 illustrates a server and terminal devices (hereinafter referred to as terminals) communicating with the server according to an embodiment of the present invention.

A server 101 and terminals 201 are connected to one another via a network 301. The network 301 is a wireless network, a wired network or a hybrid network of these. The network 301 may be a local area network or a wide area network such as the Internet.

The terminal 201 is a user terminal such as a personal computer (PC), a tablet, a smart phone and a portable terminal. The terminal includes elements included in a typical computer, circuitry (such as a CPU, a processor or a dedicated circuit), a memory, an external storage device, an input, a display and a communicator. Examples of the external storage device include an HDD, an SSD, and an SD card. Each terminal 201 acquires operating data indicating an operating status of its own device and records the operating data inside. Examples of the operating data include a sensor data log of components such as the HDD and the CPU.

In the terminal 201, a failure symptom model (hereinafter referred to as model) is implemented. The model predicts possibility in which failure occurs within a predetermined period. For example, a probability in which the failure occurs within a certain period from the present is calculated. When the probability is equal to or greater than a threshold, presence of a failure symptom can be determined. The terminal has a function for performing prediction using the model on the basis of the operating data and detecting whether the failure symptom is present. When the failure symptom is detected using the model, a user can be prompted to replace the HDD or the terminal device, for example, by being notified with a message of the presence of the failure symptom. By way of example, the model implemented in the terminal 201 is generated from the operating data on a terminal of a different machine type from that of the terminal (herein, a terminal in which the HDD of a different machine type is implemented). The different machine type is an older machine type (past machine type) than that of the HDD implemented in the terminal 201, for example. Namely, a case is supposed where the machine type of the HDD that is implemented in the terminal is different from the machine type of the HDD that the model is originally generated for.

The server 101 determines whether or not it is allowed that the terminal applies the model implemented in the terminal. This is because the model implemented in the terminal is possibly low in accuracy for the terminal, and supposing that the terminal applies such a model, it is considered that a frequency or possibility of occurrence of overlooking and misdetection becomes high. The overlooking means that the failure occurs within a predetermined period in spite of a prediction result of absence of the failure symptom. The misdetection means that a failure does not occur within a predetermined period in spite of a prediction result of the presence of a failure symptom.

When a determination result of applicability is notified from the server 101, the terminal 201 is allowed to perform failure symptom detection using the model implemented in its own device. On the other hand, when a determination result of non-applicability is notified from the server 101, the terminal 201 is not allowed to perform the failure symptom detection using this model. By doing so, that the terminal applies a model low in accuracy can be prevented and the problem of overlooking and misdetection can be prevented.

Figure 2:
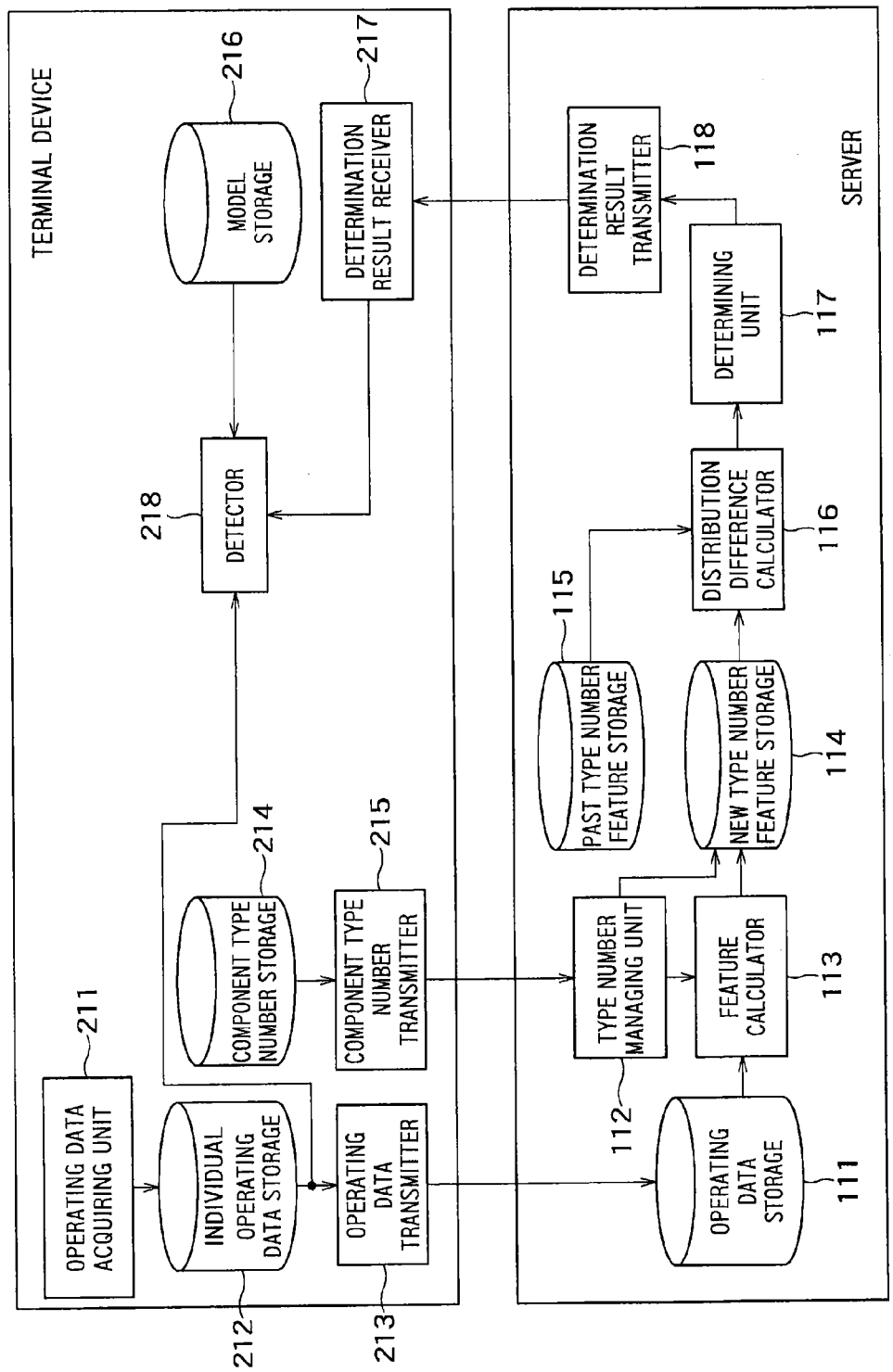
FIG. 2 illustrates functional blocks of the server and each of the terminals.

FIG. 2 illustrates functional blocks of the server 101 and the terminal 201. Each line connecting the blocks in the devices indicates a flow of information or control. Moreover, each line connecting the blocks between the terminal and the server does not indicate an actual solid wiring but simply represents relation of input/output of information between the blocks.

The terminal 201 includes an operating data acquiring unit 211, an individual operating data storage 212, an operating data transmitter 213, a component type number storage 214, a component type number transmitter 215, a model storage 216, a determination result receiver 217 and a detector 218.

The operating data acquiring unit 211 acquires the operating data on the terminal by executing a predetermined collection program. The operating data acquiring unit 211 is connected to the individual operating data storage 212 and stores the acquired operating data in the individual operating data storage 212. The individual operating data storage 212 stores a history of the operating data acquired by the operating data acquiring unit 211. The operating data indicates an operating status of the terminal and includes sensor log data on components such as the HDD and the CPU. In addition to this, it includes a "product ID" (serial number) of the terminal device and acquisition time (observation time) of the operating data. Examples of the sensor log data on the HDD include, for example, S.M.A.R.T. of the HDD. As other components, for example, data such as a temperature of the CPU and manipulation times of buttons (input) may be included therein.

An example of the operating data is illustrated in FIG. 3. The operating data in the figure is acquired data for one time. Such data is stored in the operating data storage 212 in time series. According to elapse of time, the data is sequentially accumulated. Acquisition timing of the operating data may arise at a certain time interval. Otherwise, it may be arbitrarily determined to arise as timing in initiating/terminating the terminal, timing when a specific event takes place, and similar timing.

The operating data transmitter 213 is connected to the individual operating data storage 212 and transmits the operating data stored in the individual operating data storage 212 to the server 101. The transmission may be performed for each occasion of acquisition of the operating data, transmission of untransmitted operating data may be performed at a certain interval, or the transmission may be performed in response to a request from the server 101.

The component type number storage 214 stores component type number data. An example of the component type number data is illustrated in FIG. 4. The component type number data includes a "product ID" and an "HDD type number". The "HDD type number" is a "type number" of the HDD implemented in the terminal device and identifies a machine type of the HDD. The "product ID" is an "ID" (serial number) of the terminal.

The component type number transmitter 215 is connected to the component type number storage 214 and transmits the component type number data stored in the component type number storage 214 to the server 101. The transmission of the component type number data may be performed as one-time transmission in the occasion of service registration to the server or transmission every time a request from the server 101 is given.

The model storage 216 stores the failure symptom model (model). The model predicts the possibility of the failure in the HDD within the predetermined period. Hereafter, a few examples of the model are represented.

Formula (1) below represents the logistic regression model. The formula includes variables "$x^1$" . . . "$x^k$" and coefficients "$a^0$" . . . "$a^k$" as a model parameter. The coefficient "$a^0$" is also called a constant term. To the variables, features calculated on the basis of the operating data are allocated. Details of the features are mentioned later. The coefficients are arbitrary real numbers. "P" is a failure probability. "P" takes a value larger than "0" and smaller than "1". "P" is a value representing a magnitude of occurrence possibility of the failure. The larger the value of "P" is, the larger it is meant that the possibility of the failure within the predetermined period is. When the value of "P" is equal to or greater than a threshold, the presence of the failure symptom may be determined, and when it is less than the threshold, the absence of the failure symptom may be. While the predetermined period may be arbitrarily defined, for example, it may be a certain period from a current time, may be a period to predefined next terminal replace time, or may be a period defined on the basis of any other standard.

[Formula 1]

$$P = \frac{1}{1 + \exp(a^0 + a^1 x^1 + a^2 x^2 + \ldots + a^k x^k)} \quad \text{Formula (1)}$$

Moreover, in accordance with the value of the failure probability "P", a failure symptom rank may be calculated. For example, when P>α, it represents "dangerous", when α≥P>β, it represents "cautioned", and when P≤β, it represents "normal".

FIG. 5 illustrates examples of the variables. There are nine variables to which the features based on the operating data are respectively allocated. The variables in the figure respectively correspond to the variables "$x^1$", "$x^2$", "$x^3$", "$x^4$", "$x^5$", "$x^6$", "$x^7$", "$x^8$" and "$x^9$" in formula (1). For example, to the variables $x^1$, the feature of an "average of a CPU temperature" calculated from the operating data is allocated. The coefficients ("$a^0$", "$a^1$", "$a^2$", "$a^3$", "$a^4$", "$a^5$", "$a^6$", "$a^7$", "$a^8$" and "$a^9$") to the variables are previously calculated.

Examples of the model other than the logistic regression model include the support vector machine, the linear discriminant analysis model and the like. In these cases, the model can be represented by formula (2) below.

[Formula 2]

$$y = a^0 + a^1 x^1 + a^2 x^2 + \ldots + a^k x^k \quad \text{Formula (2)}$$

The variables "$x^1$" ... "$x^k$" and the coefficients "$a^0$" ... "$a^k$" are the variables and the coefficients similarly to those in formula (1). The value of "y" indicates the magnitude of the occurrence possibility of the failure. Setting a threshold, when the value of "y" is equal to or greater than the threshold, the presence of the failure symptom can be determined, and when it is less than the threshold, the absence of the failure symptom can be. For example, when y≥0, the presence of the failure symptom is set, and when y<0, the absence of the failure symptom is.

The determination result receiver 217 receives a determination result of whether or not usage of the model in the model storage 216 is allowed from the server 101. The received determination result is handed over to the detector 218.

The detector 218 is connected to the determination result receiver 217 and receives the determination result of the server 101 from the determination result receiver 217. When the determination result indicates allowance, the detector 218 is allowed to perform the failure symptom detection using the model in the model storage 216. When the determination result indicates no allowance, the failure symptom detection using the model in the model storage 216 is not performed. When the usage of the model is allowed, the detector 218 performs the failure symptom detection in desired timing. For example, it may be performed for each occasion of acquiring one piece of operating data, may be performed upon input of an instruction from the outside, or may be performed in the occasion when a specific event takes place. The failure symptom detection is performed by calculating the features using the operating data in the individual operating data storage 212 and allocating the calculated features to the variables of the model.

The server 101 includes an operating data storage 111, a type number managing unit 112, a feature calculator 113, a new type number feature storage 114, a past type number feature storage 115, a distribution difference calculator 116, a determining unit 117 and a determination result transmitter 118.

The type number managing unit 112 receives component type number data from each terminal. The type number managing unit 112 manages type number management data which collectively presents the "product IDs" of the terminals and the "HDD type numbers" which are associated with each other on the basis of the received component type number data. An example of the type number management data is illustrated in FIG. 6.

The operating data storage 111 collectively stores the operating data transmitted from each terminal. An example of the operating data stored by the operating data storage 111 is illustrated in FIG. 7. Pieces of operating data for the plural terminals are stored. While one piece of operating data is herein stored for each terminal, plural pieces thereof may be stored for each in time series in fact.

Figure 8:
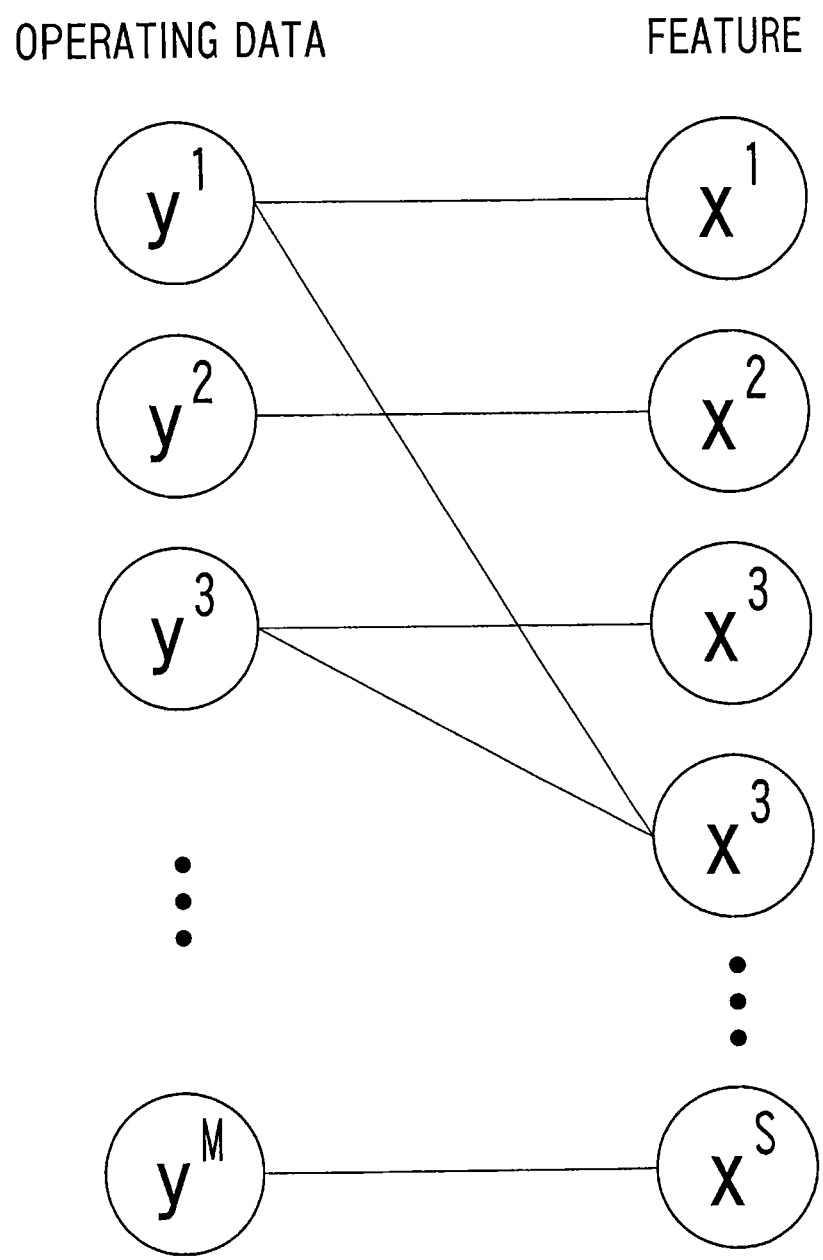
FIG. 8 illustrates relation between the operating data and features.

The feature calculator 113 calculates one or plural features from the operating data individually for each terminal. The feature calculator 113 is connected to the operating data storage 111 and reads out the operating data for each terminal from the operating data storage 111. Relation between the pieces of operating data "y" and the features "x" is illustrated in FIG. 8. Signs "$y^1$", "$y^2$" ... "$y^M$" denote values of respective items of the operating data. Signs "$x^1$", "$x^2$" ... "$x^S$" denote the features calculated from the operating data. For example, "$x^1$" is the value of item "$y^1$" of the operating data and "$x^4$" is a value calculated from items "$y^1$" and "$y^3$" of the operating data. In this way, the features are calculated from the operating data.

As examples of calculation of the features, a latest value (newest value), a maximum value of a difference and an average value are presented below. Sign "t" denotes time.

(1) Latest value $$x^1 = y^1_t$$

(2) Maximum value of the difference $$x^2 = \max[\{y^2_{t-i} - y^2_{t-i-1} | i=0,2,3,4 \ldots \}]$$

(3) Average value $$x^3 = \max[\{y^3_{t-i} | i=0,1,2,3,4 \ldots \}] \quad \text{[Formula 3]}$$

Moreover, the feature using plural pieces of operating data can also be defined. For example, a sum of the same items of the latest two pieces of operating data can also be defined as the feature. This example is as follows.

(4) Sum of items of the latest two pieces of operating data $$x^4 = y^1_t + y^3_t \quad \text{[Formula 4]}$$

The past type number feature storage 115 stores a dataset of the features calculated from the operating data used in constructing the model implemented in the terminal 201. For example, when the features are three kinds of ("$x^1$", "$x^2$", "$x^3$"), a number of pieces of the data ("$x^1$", "$x^2$", "$x^3$") are stored. The operating data used in constructing the model is the operating data for the terminal in which the HDD of a past "type number" (old "type number") is implemented.

The feature calculator 113 determines whether the "product ID" of the terminal for which the features are calculated is registered in the type number managing unit 112. In the case of being registered, the calculated features are stored in the new type number feature storage 114. For example, an entry including the "product ID", the "HDD type number" and the features for the terminal is added. When the "product ID" of the terminal is not registered in the type number managing unit 112, the feature calculator 113 may discard the read operating data, which is regarded as the operating data for the terminal that the HDD of an old "type number" is implemented in. Otherwise, as another method, when the past type number feature storage 115 stores the features for the same "type number", the features may be calculated to be added to the past type number feature storage 114.

The distribution difference calculator 116 is connected to the new type number feature storage 114 and the past type number feature storage 115 and reads out pieces of data on the features stored respectively in those. Then, a distribution of the features read out from the new type number feature storage 114 and a distribution of the features read out from the past type number feature storage 115 are calculated to calculate difference information representing a difference between these. Namely, the difference information represents a difference between a distribution of the features calculated from the operating data used in constructing the model and a distribution of the features calculated from the operating data for the terminal that the HDD of the new "type number" is implemented in. The distribution difference calculator 116 reads out, for example, the entirety of data on the features or a certain number of pieces of the data for the relevant machine type from the new type number feature storage 114. Otherwise, in the occasion when the features are stored in the new type number feature storage 114, the feature calculator 113 can also be configured to give them observation time included in the operating data and to read out the data within a certain period or predetermined number of pieces of the newest data. Moreover, the entirety of data on the features or a certain number of pieces of the data may be read out from the past type number feature storage 115.

The distribution difference calculator 116 may perform the processing every time one entry including the "product ID", the "HDD type number" and the features for the terminal is added to the new type number feature storage 114. Otherwise, it may perform the processing every time a predetermined number of entries are added for each "HDD type number". Otherwise, it may perform the processing in timing instructed from the outside. Otherwise, it may perform the processing in timing other than that mentioned here.

Hereafter, the features stored in the past type number feature storage 115, that is, the features calculated from the operating data used in constructing the model are sometimes called "past type number features". Moreover, the features stored in the new type number feature storage 114, that is, the features calculated from the operating data for the terminal that the HDD of the new "type number" is implemented in are sometimes called "new type number features".

Hereafter, an example of calculation of the difference information between the distribution of the past type number features and the distribution of the new type number features is presented.

Figure 9:
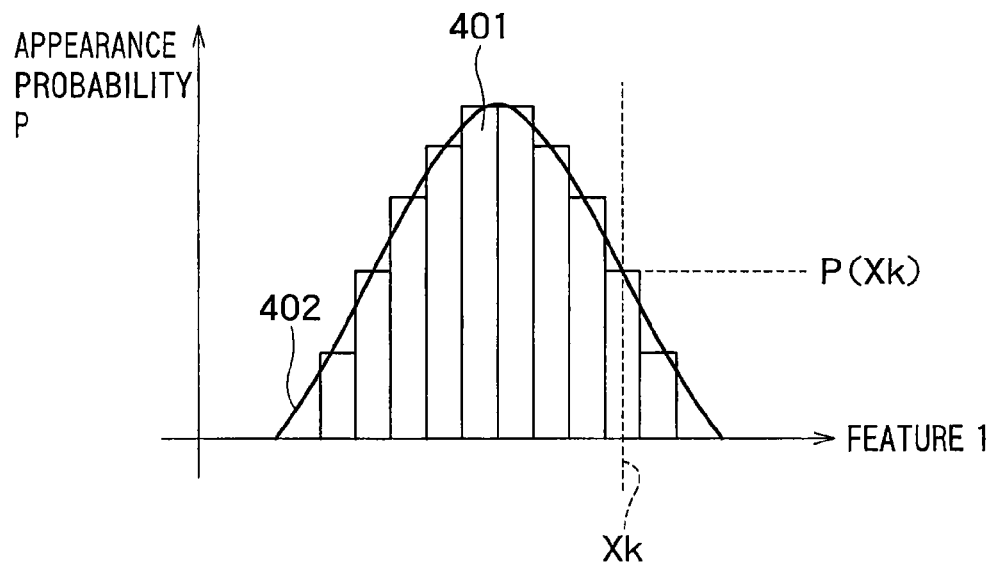
FIG. 9 is a diagram for explaining a distribution of past type number features and a value appearance probability of a new type number feature.

(1) Value Appearance Probability of New Type Number Feature in Distribution of Past Type Number Features Using FIG. 9, the distribution of the past type number features and a value appearance probability of the new type number feature are described. The distribution of the past type number features is a distribution of the features calculated from the operating data used in constructing the model implemented in the terminal as mentioned above. For example, it is a non-parametric distribution like a histogram 401 or a distribution obtained by fitting to a parametric distribution function 402 such as the normal distribution, as illustrated in FIG. 9.

A likelihood is calculated using the following formula, where the distribution of the past type number features is set as "P(x)", the feature of a "kth" terminal in which the HDD of the new "type number" is implemented is set as "$x_k$", and the value appearance probability of "$x_k$" is set as "P($x_k$)" (refer to FIG. 9).

$$L = \prod_k P(x_k) \qquad \text{[Formula 5]}$$

Then, a negative logarithm likelihood is calculated using the following formula.

$$-\ln L = -\sum_k \ln P(x_k) \qquad \text{[Formula 6]}$$

When the plural features are present, the likelihood and the negative logarithm likelihood are sufficient to be calculated for each feature.

(2) Distance Between Probability Distributions

Figure 10:
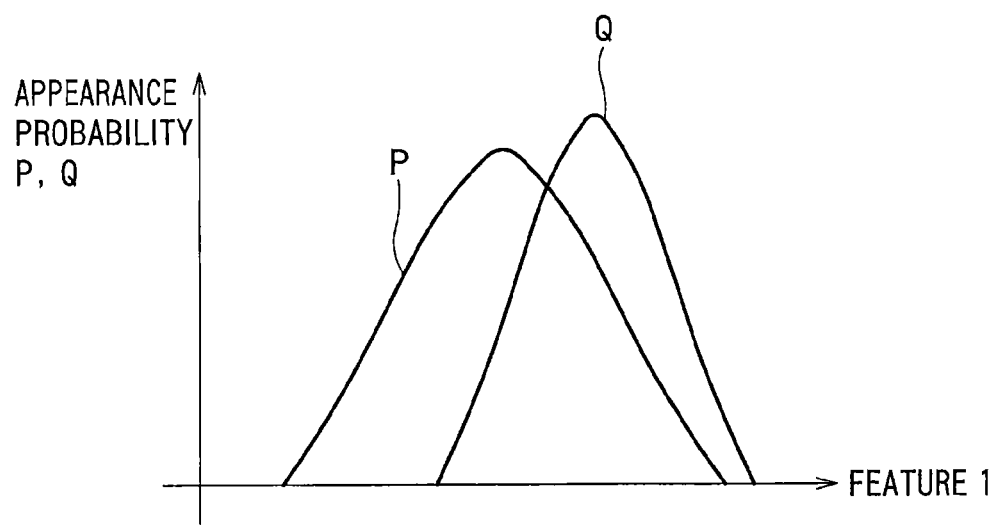
FIG. 10 illustrates an example of two probability distributions.

A probability distribution of the past type number features is set as "P" and a probability distribution of the new type number features is set as "Q". Examples of the distributions "P" and "Q" are illustrated in FIG. 10. Here, a distance between "P" and "Q" is calculated. As the distance between the probability distributions, by way of example, the Kullback-Leibler divergence is calculated. When "P" and "Q" are set as discrete probability distributions, the Kullback-Leibler divergence "$D_{KL}$" of "Q" relative to "P" is calculated as follows.

$$P(i), Q(i) \qquad \text{[Formula 7]}$$

are probabilities in which the values selected in accordance with the probability distributions "P" and "Q" are "i", respectively. When the plural features are present, the divergence may be calculated regarding this feature group as a vector or the divergence may be calculated for each feature.

$$D_{KL}(Q \| P) = \sum_i Q(i) \ln \frac{Q(i)}{P(i)} \qquad \text{[Formula 8]}$$

On the other hand, when "P" and "Q" are continuous probability distributions, the Kullback-Leibler divergence is calculated as follows.

$$D_{KL}(Q \| P) = \int_{-\infty}^{\infty} Q(x) \ln \frac{Q(x)}{P(x)} dx \qquad \text{[Formula 9]}$$

Maximum Value $D_{max}$ and [Formula 10]
Minimum value $D_{min}$ of Absolute
Value of Difference between Features A maximum value "$D_{max}$" and a minimum value "$D_{min}$" of a difference between the features are calculated between the terminal that the HDD of the new "type number" is implemented in and the terminal that the HDD of the past "type number" is implemented in for each feature. Hereafter, calculation formulas of the maximum value "$D_{max}$" and the minimum value "$D_{min}$" are presented.

Herein, "k" means the "kth" terminal in which the HDD of the new "type number" is implemented, and "j" means the "jth" terminal in the operating data used in constructing the model. When the plural features are present, "$D_{max}$" and "$D_{min}$" are sufficient to be calculated for each feature.

$$D_{max} = abs\left[\max_j x_j - \max_k x_k\right] \quad \text{[Formula 11]}$$

$$D_{min} = abs\left[\min_j x_j - \min_k x_k\right]$$

(4) Difference in Correlation Coefficient between Features [Formula 12]

$$D_{corr} = abs[corr(x_j^s, x_j^t) - corr(x_k^s, x_k^t)]$$
$$(j \in D^{old}, k \in D^{new})$$

"$x_j^s, x_j^t$" means the values of the "sth" and "tth" items in the features used in constructing the model, and "$corr(x_j^s, x_j^t)$" means the Pearson's product-moment correlation coefficient between "$x_j^s$" and "$x_j^t$". Similarly, "$x_k^s, x_k^t$" means the values of the "sth" and "tth" items in the features for the new "type number", and "$corr(x_k^s, x_k^t)$" means the Pearson's product-moment correlation coefficient between "$x_k^s$" and "$x_k^t$". In place of the correlation coefficients, covariances may be calculated.

Herein, the Pearson's product-moment correlation coefficient is calculated using the following formula, where "N" is the number of the terminals (number of the samples). Moreover, $$corr(x_j^s, x_j^t) = \frac{\sum_{j=1}^{N}(x_j^s - \overline{x}^s)(x_j^t - \overline{x}^t)}{\sqrt{\sum_{j=1}^{N}(x_j^s - \overline{x}^s)^2}\sqrt{\sum_{j=1}^{N}(x_j^t - \overline{x}^t)^2}} \quad \text{[Formula 13]}$$

$\overline{x}^s$ is the average value of the "sth" features.

The determining unit 117 determines model applicability/non-applicability on the basis of the distribution difference information (–ln L, $D_{KL}$, $D_{max}$, $D_{min}$, $D_{corr}$) ([Formula 14]) calculated by the distribution difference calculator 116. Note that all of these items of the distribution difference information do not have to be calculated but at least one of these items may be calculated. Moreover, when the plural features are present, the items for all of the features may not be calculated but the items for a part of the features may be calculated. In this case, the features to be calculated may be different depending on the item.

Figure 11:
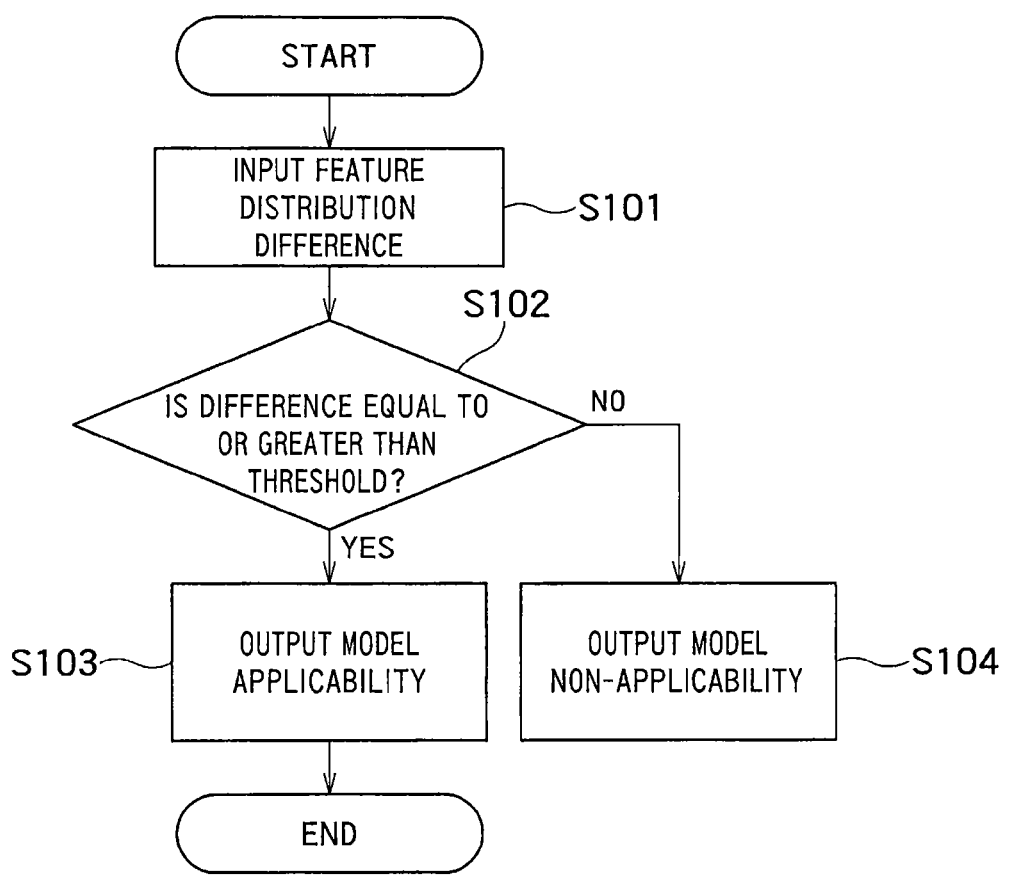
FIG. 11 illustrates an operation flow of the determining unit.

FIG. 11 illustrates an operation flow of the determining unit 117. When the distribution difference information is received from the distribution difference calculator 116 (S101), the determining unit 117 compares each item of the distribution difference information with a threshold for each one (S102). When any one of them is less than the threshold, it is determined that the model can be applied (NO in S102; S103), and when all of them are equal to or greater than the thresholds, the non-applicability is determined (YES in S102; S104). Otherwise, when the values of arbitrary "H" items ("H" is two or more and five or less) are less than the respective thresholds, it may be determined that the failure symptom model can be applied (NO in S102; S103), and otherwise, the non-applicability may be determined (YES in S102; S104). The determination is performed for each "HDD type number". The determination result indicates the applicability or the non-applicability of the model. In the threshold determination for each item, when the item is calculated for the plural features, it may be required that the value of the relevant item is less than the threshold for each of all of the features. Otherwise, it may be required that the value of the relevant item is less than the threshold only for each of an arbitrary predetermined number of features. The value of the relevant predetermined number may be different depending on the item.

The determination result transmitter 118 transmits the determination result of the determining unit 117 to each of the terminals. It is supposed that transmission destination addresses for the terminals are beforehand associated with the "product IDs" of the terminals to be managed. Such association may be managed in a form of a table by the type number managing unit 112.

Figure 12:
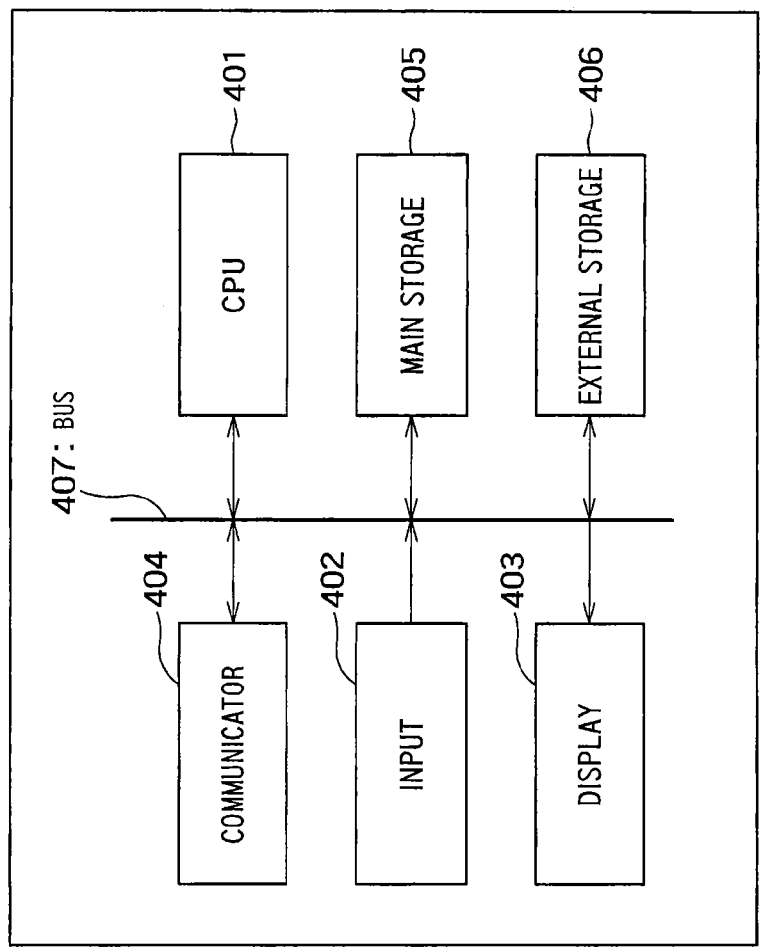
FIG. 12 illustrates an exemplary hardware configuration of the terminal.

FIG. 12 illustrates an exemplary hardware configuration of the terminal. The terminal includes a CPU 401, an input 402, a display 403, a communicator 404, a main storage 405 and an external storage 406 which are connected via a bus 407, so that these can communicate with one another.

The input 402 includes input devices such as a keyboard and a mouse. The display 403 includes a display such as a liquid crystal display (LCD) and a cathode ray tube (CRT). The communicator 404 has wireless or wired communicating means and performs communication in a predetermined communication scheme.

The external storage 406 includes a storage medium such, for example, as an HDD, an SSD, a memory device, a CD-R, a CD-RW, a DVD-RAM and a DVD-R. The external storage 406 stores a program for causing the CPU 401 to execute processing of the detector 218, the operating data acquiring unit 211, the operating data transmitter 213 and the determination result receiver 217. Moreover, the external storage 406 also includes the individual operating data storage 212, the component type number storage 214 and the model storage 216. The failure symptom detection is performed, by way of example, for the external storage 406 as a target.

The main storage 405 expands a control program stored in the external storage 406 under the control with the CPU 401 and stores data required in executing the program, data generated in executing the program, and similar data. The main storage 405 includes an arbitrary memory such, for example, as a non-volatile memory.

Figure 13:
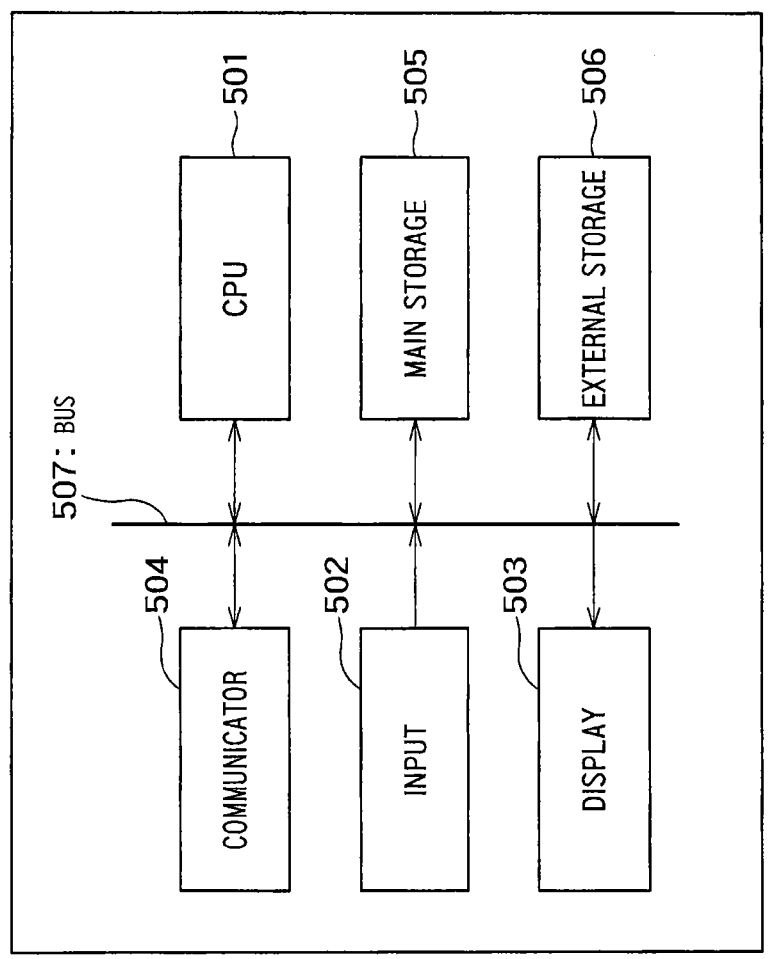
FIG. 13 illustrates an exemplary hardware configuration of the server.

FIG. 13 illustrates an exemplary hardware configuration of the server. The server includes the CPU 501, the input 502, the display 503, the communicator 504, the main storage 505 and the external storage 506 which are connected via a bus 507, so that these can communicate with one another.

The input 502 includes input devices such as a keyboard a mouse. The display 503 includes a display such as a liquid crystal display (LCD) and a cathode ray tube (CRT). The communicator 504 has a wireless or wired communicator and performs communication in a predetermined communication scheme.

The external storage 506 includes such, for example, as an HDD, an SSD, a memory device, a CD-R, a CD-RW, a DVD-RAM and a DVD-R. The external storage 506 stores a program for causing the CPU 501 to execute processing of the feature calculator 113, the type number managing unit 112, the distribution difference calculator 116, the determining unit 117 and the determination result transmitter 118. Moreover, the external storage 506 also includes the operating data storage 111, the new type number feature storage 114 and the past type number feature storage 115.

The main storage 505 expands a control program stored in the external storage 506 under the control of the CPU 501 and stores data required in executing the program, data generated in executing the program, and similar data. The main storage 505 includes an arbitrary memory such, for example, as a non-volatile memory.

Figure 14:
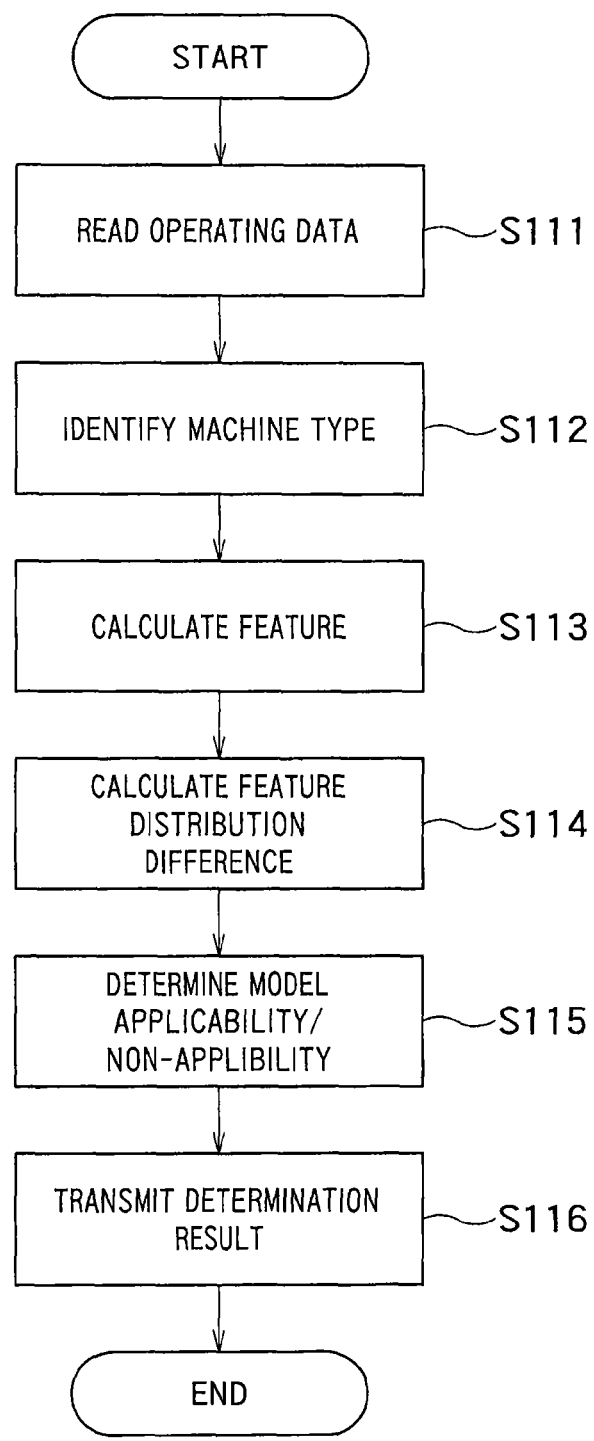
FIG. 14 is a flowchart of processing of the server according to the first embodiment.

FIG. 14 is a flowchart of processing of the server according to the embodiment.

The feature calculator 113 reads the operating data from the operating data storage 111 (S111). For example, it reads all of the pieces of operating data which have not been read before. As to the operating data for the same terminal, pieces of the operating data with different time may be set as reading targets, or pieces of the operating data for which a certain period elapses from the acquisition time may be set as the reading targets. Timing of the reading may arise at a time point when an instruction from the outside is received or at a certain time interval, or may be any other timing.

The feature calculator 113 identifies the "type number" of the HDD implemented in the terminal that the operating data is read for (machine type of the HDD) with respect to the type number managing unit 112 (S112).

The feature calculator 113 calculates the feature from the read operating data (S113). The feature is allocated to the variable in the model as mentioned above. When the plural variables are present in the model, the plural features are calculated. The calculated feature is associated with the "HDD type number" and the "product ID" of the terminal to be stored in the new type number feature storage 114.

The distribution difference calculator 116 calculates the difference information between the distribution of the features in the past type number feature storage 115 and the distribution of the features in the new type number feature storage 114 (S114). Namely, the difference information between the distribution of the features for the operating data used in constructing the model (operating data for the terminal that the HDD of the past "type number" is implemented in) and the distribution of the features for the operating data for the terminal that the HDD of the new "type number" is implemented in.

The determining unit 117 compares the distribution difference information calculated by the distribution difference calculator 116 with the threshold and determines whether or not the model can be applied (S115). Detailed determination processing is performed in accordance with the above-mentioned flow in FIG. 10.

The determination result transmitter 118 transmits the determination result of the determining unit 117 to the terminal that the HDD of the "HDD type number" (HDD machine type) for which the determination is performed is implemented in (S116). In the case of a configuration in which the calculation of the distribution difference information is performed every time one piece of operating data is read, the terminals for transmission targets may be only the terminals for which the relevant operating data is read. It should be noted that the transmission to the other terminals is desirable to be performed when the determination result is different from that in the previous transmission for the relevant machine type.

In the embodiment, while it is supposed as a premise that the same model is implemented in the terminals, the implemented model may be different among the terminals. In this case, the server manages information representing the implemented model for each terminal. The past type number feature storage 115 categorizes and stores the past type number features for each kind of model. The distribution difference calculator 116 is sufficient to identify the implemented model for each terminal and calculates the distribution difference information using the distribution for the past type number features corresponding to the identified model to determine the model applicability/non-applicability.

Notably, in the embodiment, while the different "HDD type number" affords the different HDD machine type, wider segmentation with the machine types may be considered and the case where the plural "type numbers" belong to the same machine type may be targeted. In this case, the processing performed for each "type number" in the embodiment is sufficient to be configured to be performed for each machine type and the "type numbers" belonging to the same machine type are sufficient to be targeted as the same processing. This is possible by the server previously to store an association table between the machine types and the "type numbers".

As above, according to the embodiment, model applicability/non-applicability is determined on the basis of distribution difference information of the features from the operating data. Thereby, opportunity of application of a model low in accuracy can be reduced and overlooking and erroneous warning can be suppressed. Namely, the HDDs of the new "type number" only afford a small number of failure HDDs and samples of the operating data on the failure HDDs. Due to this, in an initial stage of the new "type number" to be spreading, it is difficult that the accuracy of the model generated from the operating data for the same "type number" is investigated. Therefore, it is considered that the model generated from the operating data for the existing "type number" is applied. Nevertheless, since the different "type number" gives the different tendency of an operating state of the HDD, it is needed that it is determined whether the model can be applied to the new "type number". In the embodiment, the distribution of the new type number features is compared with the distribution of the past type number features. Thereby, the model applicability/non-applicability is determined. Accordingly, an improper model can be prohibited from being applied and costs due to overlooking and erroneous warning can be suppressed from occurring.

Second Embodiment

Figure 15:
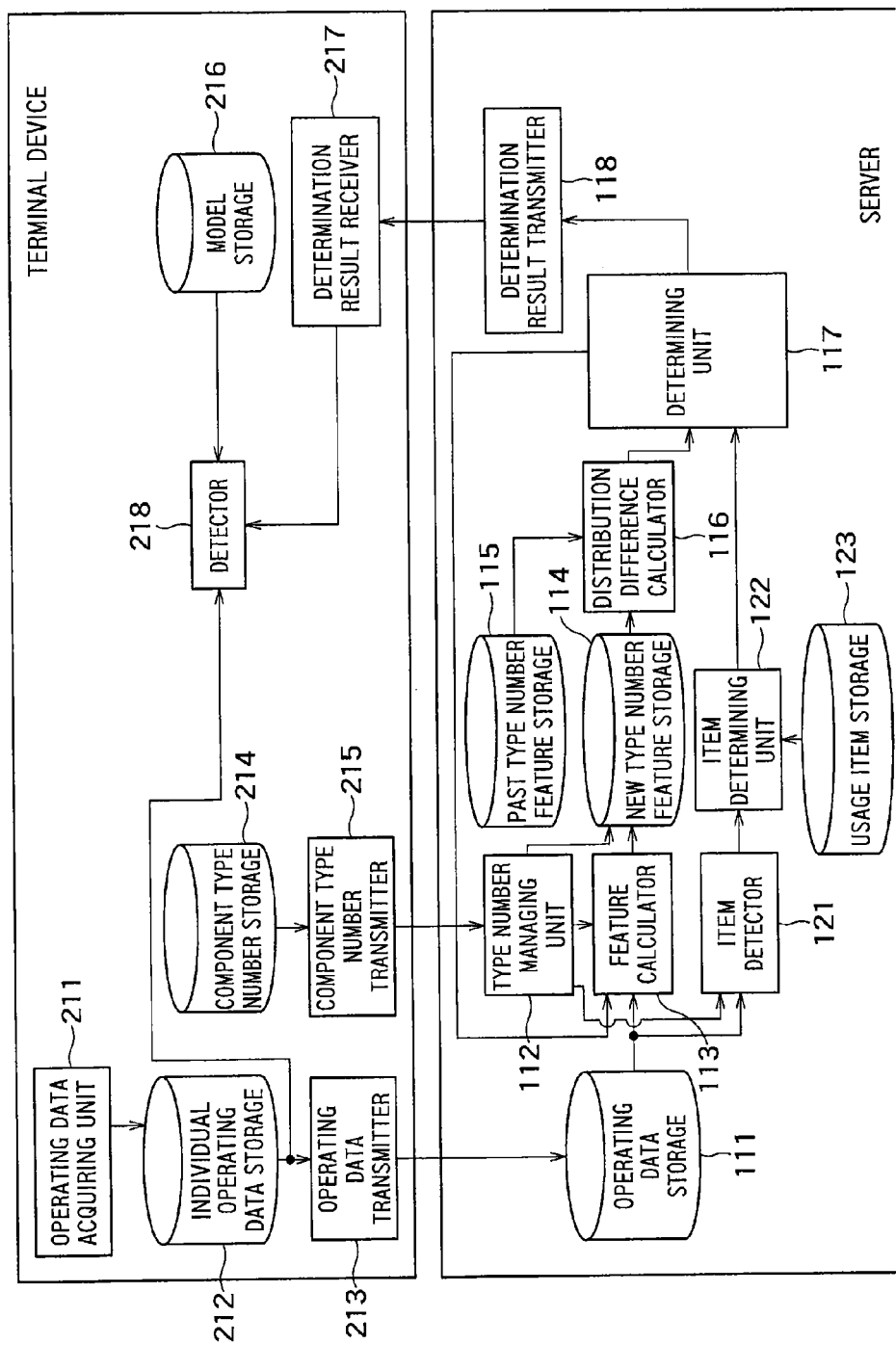
FIG. 15 is a functional block diagram of a server and a terminal according to a second embodiment.

FIG. 15 illustrates a functional block diagram of a server and a terminal according to the embodiment. While the configuration of the terminal is same as that in the first embodiment, the configuration of the server is different. Specifically, in the embodiment, an item detector 121, an item determining unit 122 and a usage item storage 123 are added to the server.

The item detector 121 is connected to the operating data storage 111 and reads out the operating data from the operating data storage 111 to detect items of the operating data. For example, S.M.A.R.T. data items of the HDD are detected.

The usage item storage 123 stores items of the operating data that are required for calculation of the features allocated to the variables of the model. There is a case where calculation of one feature needs one item and a case where calculation of one feature needs plural items, and all of these items are stored.

The item determining unit 122 determines whether the items detected by the item detector 121 include all of the items stored in the usage item storage 123 and outputs the determination result to the determining unit 117.

Figure 16:
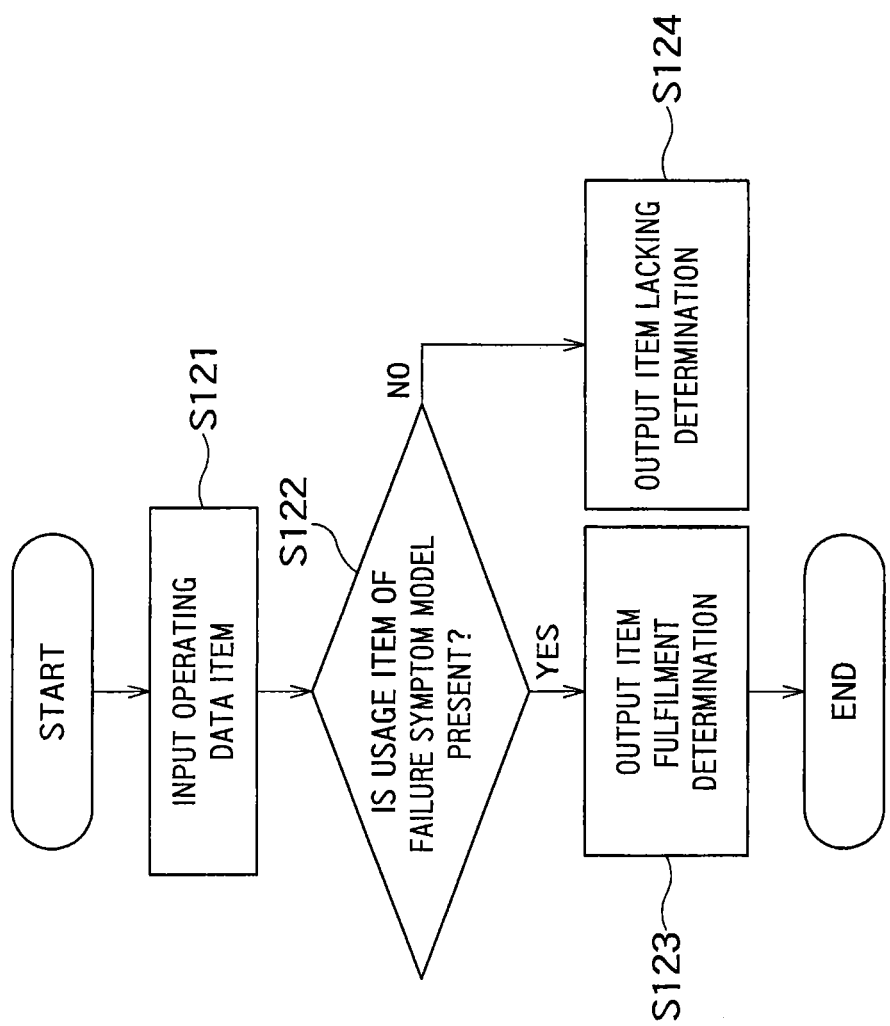
FIG. 16 illustrates a processing flow of an item determining unit.

FIG. 16 illustrates a processing flow of the item determining unit 122. All of the items detected by the item detector 121 are received (S121). It is determined whether all of the items stored in the usage item storage 123 are included in the items received from the item detector 121.

When even only one item that is not included therein exists (NO in S122), an item lacking determination result is outputted (S124). When all of the items are included therein, an item fulfillment determination result is outputted (YES in S122; S123).

The determining unit 117 determines the model non-applicability when the item lacking determination result is inputted from the item determining unit 122. In this case, the determination result of the non-applicability is transmitted from the determination result transmitter 118. On the other hand, when the item fulfillment determination result is inputted from the item determining unit 122, the calculation of the features, the calculation of the distribution difference and the determination of applicability/non-applicability are performed similarly to the first embodiment.

Figure 17:
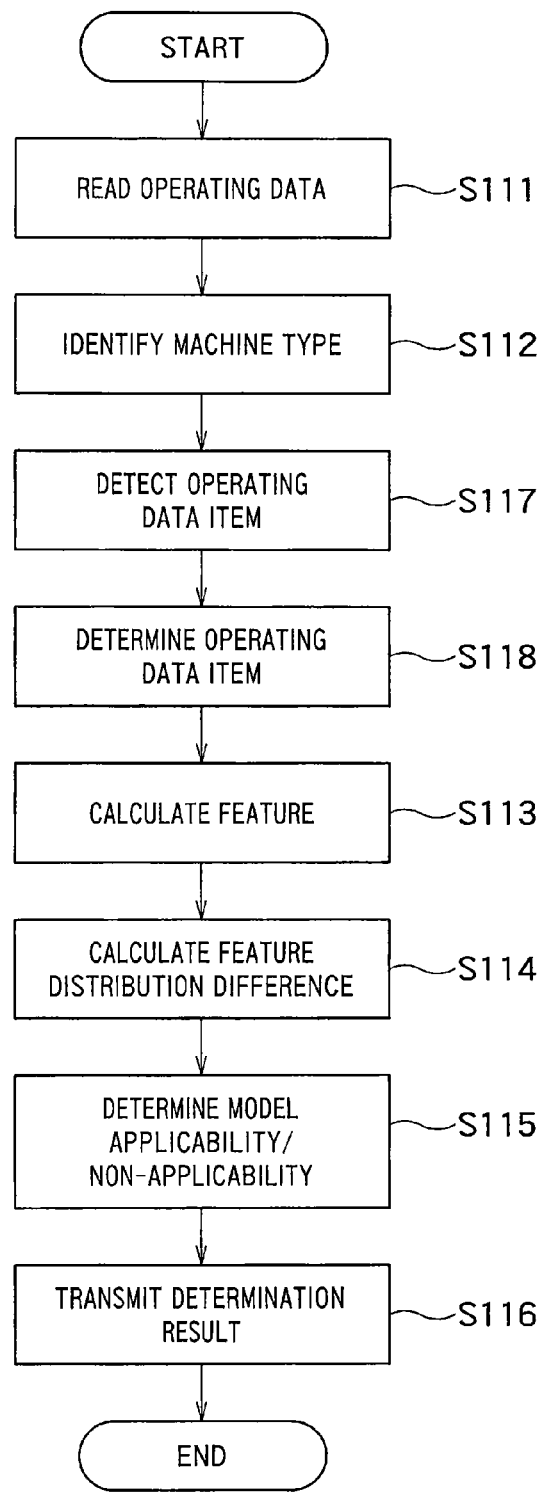
FIG. 17 is a flowchart of processing of the server according to the second embodiment.

FIG. 17 is a flowchart of processing of the server according to the embodiment. In the flowchart of FIG. 14 used in the first embodiment, step S117 and step S118 are added between step S112 and step S113.

In step S117, the item detector 121 reads out the operating data from the operating data storage 111 and detects the items of the read-out operating data. In step S118, the item determining unit 122 performs the determination in accordance with the flow in FIG. 16 and outputs the item lacking determination result or the item fulfillment determination result. The determining unit 117 determines the model non-applicability when the item lacking determination result is inputted. In this case, the determination result of the non-applicability is transmitted from the determination result transmitter 118. When the item fulfillment determination result is inputted, the control is performed to put the process forward to the calculation of the features (S113). The same holds true afterward as the first embodiment.

In the flow of FIG. 17, the processing may be performed for each occasion of reading out one piece of operating data, and when the item fulfillment determination result is obtained, the process may be put forward to the calculation of the features. Otherwise, plural pieces of operating data may be read out to calculate the features for each piece of operating data.

As above, according to the embodiment, it is configured that, before the calculation of the features at the feature calculator 113, it is inspected whether the items of the operating data include the items required for calculating the features of the model. Thereby, efficient processing is possible. Namely, in case where the inspection is not performed, there is a possibility that the processing that has been performed before becomes useless at the stage where it is found that the features cannot be calculated because of the absence of the item required for the calculation during the process of sequentially calculating the plural features. Nevertheless, it is here previously confirmed whether all of the items required for the calculation of the features are completed. Thereby, such useless processing can be prevented from occurring.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A server including a processor, comprising:
a distribution difference calculator to calculate difference information between a first distribution and a second distribution, the first distribution being a distribution of features calculated from operating data on terminal devices of a first machine type and the second distribution being a distribution of features calculated from operating data on terminal devices of a second machine type wherein the second machine type is different from the first machine type; and
a determiner to determine whether a model is applicable to the terminal devices of the first machine type to predict occurrence possibility of a failure in each of the terminal devices of the first machine type on basis of the difference information,
wherein the model is generated on basis of operating data of the terminal devices of the second machine type and is configured to predict occurrence possibility of a failure in each of the terminal devices of the second machine type on basis of each of the features calculated from the operating data thereof,
wherein the first distribution is a probability distribution of the features calculated from the operating data of the terminal devices of the first machine type,
wherein the second distribution is a probability distribution of the features calculated from the operating data of the terminal devices of the second machine type, and
wherein the distribution difference calculator calculates a distance between the probability distributions, the distance being the difference information.

2. The server according to claim 1, wherein the distance between the probability distributions is a Kullback-Leibler divergence.

3. The server according to claim 1, further comprising:
a determination result transmitter to transmit a determination result indicating whether the model is applicable as determined by the determiner, to the terminal devices of the first machine type.

4. The server according to claim 1,
wherein the terminal device of the first machine type includes a storage device,
wherein the model is configured to predict the occurrence possibility of the failure in the storage device included in the terminal device of the first machine type, and
wherein the operating data of the terminal device of the first machine type includes operating data of the storage device.

5. The server according to claim 1, further comprising:
an operating data storage to store the operating data of the terminal devices of the first machine type therein; and
a feature calculator to calculate the feature on basis of the operating data in the operating data storage.

6. The server according to claim 1, wherein the model is any one of a logistic regression model, a support vector machine and a linear discriminant analysis model.

7. A server including a processor, comprising:
a distribution difference calculator to calculate difference information between a first distribution and a second distribution, the first distribution being a distribution of features calculated from operating data on terminal devices of a first machine type and the second distribution being a distribution of features calculated from operating data on terminal devices of a second machine type wherein the second machine type is different from the first machine type; and a determiner to determine whether a model is applicable to the terminal devices of the first machine type to predict occurrence possibility of a failure in each of the terminal devices of the first machine type on basis of the difference information, wherein the model is generated on basis of operating data of the terminal devices of the second machine type and is configured to predict occurrence possibility of a failure in each of the terminal devices of the second machine type on basis of each of the features calculated from the operating data thereof, wherein the operating data of the terminal device of the second machine type includes a plurality of items, wherein the feature on each of the terminal devices of the second machine type is calculated from a predetermined item out of the items in the operating data thereof, wherein the server further comprises:
    a detector to detect the items in the operating data of the terminal device of the first machine type, and
    an item determiner to determine whether the items detected by the detector include the predetermined item, and wherein the determiner determines non-applicability of the model when the items detected by the detector do not include the predetermined item.

8. The server according to claim 4, wherein the storage device included in the terminal device of the first machine type is different in machine type from a storage device included in the terminal device of the second machine type.

9. A method performed by a processor, comprising:
    calculating difference information between a first distribution and a second distribution, the first distribution being a distribution of features calculated from operating data of terminal devices of a first machine type and the second distribution being a distribution of features calculated from operating data of terminal devices of a second machine type wherein the second machine type is different from the first machine type; and
    determining whether a model is applicable to the terminal devices of the first machine type to predict occurrence possibility of a failure in each of the terminal devices of the first machine type on basis of the difference information wherein the model is generated on basis of operating data of the terminal devices of the second machine type and is configured to predict occurrence possibility of a failure in each of the terminal devices of the second machine type on basis of each of the features calculated from the operating data thereof, wherein the first distribution is a probability distribution of the features calculated from the operating data of the terminal devices of the first machine type, wherein the second distribution is a probability distribution of the features calculated from the operating data of the terminal devices of the second machine type, and wherein a distance is calculated between the probability distributions, the distance being the difference information.

10. A non-transitory computer-readable medium having instructions stored therein which, when executed by a processor, cause the processor to:
    calculate difference information between a first distribution and a second distribution, the first distribution being a distribution of features calculated from operating data of terminal devices of a first machine type and the second distribution being a distribution of features calculated from operating data of terminal devices of a second machine type wherein the second machine type is different from the first machine type; and
    determine whether a model is applicable to the terminal devices of the first machine type to predict occurrence possibility of a failure in each of the terminal devices of the first machine type on basis of the difference information wherein the model is generated on basis of operating data of the terminal devices of the second machine type and is configured to predict occurrence possibility of a failure in each of the terminal devices of the second machine type on basis of each of the features calculated from the operating data thereof, wherein the first distribution is a probability distribution of the features calculated from the operating data of the terminal devices of the first machine type, wherein the second distribution is a probability distribution of the features calculated from the operating data of the terminal devices of the second machine type, and wherein a distance is calculated between the probability distributions, the distance being the difference information.

* * * * *